United States Patent [19]

Tsujimura

[11] Patent Number: 4,730,511
[45] Date of Patent: Mar. 15, 1988

[54] VALVE ACTUATING MECHANISM

[75] Inventor: Yukio Tsujimura, Higashi-Osaka, Japan

[73] Assignee: Osaka Kikiseizo Kabushiki Kaisha, Higashi-Osaka, Japan

[21] Appl. No.: 23,229

[22] Filed: Mar. 9, 1987

Related U.S. Application Data

[63] Continuation-in-part of Ser. No. 764,412, Aug. 9, 1985, abandoned.

[30] Foreign Application Priority Data

Aug. 10, 1984 [JP] Japan ............................. 59-123000[U]

[51] Int. Cl.$^4$ .................. F16H 53/00; B23Q 1/04; B25B 1/08; B25B 5/08
[52] U.S. Cl. ........................................ 74/567; 263/66; 263/233; 74/99 A
[58] Field of Search .................. 74/567, 568 R, 569, 74/99 A, 99 R, 89.15, 107; 269/66, 233; 414/744 R; 70/284; 92/33; 251/58

[56] References Cited

U.S. PATENT DOCUMENTS 3,583,245 6/1971 Schaefer ........................... 74/99
4,665,650 5/1987 Hall ................................ 74/99 A

FOREIGN PATENT DOCUMENTS

51-57377  5/1976  Japan ....................... 74/567
59-1998   1/1984  Japan ....................... 74/567
61-19292  8/1986  Japan ....................... 74/567

Primary Examiner—Gary L. Smith
Assistant Examiner—Vinh Luong
Attorney, Agent, or Firm—Birch, Stewart, Kolasch & Birch

[57] ABSTRACT

A mechanism for actuating a non-slidable disk type valve, which comprises a hollow cam body having a specific guide groove and axially slidable without rotation within a stationary casing, a cam follower relatively movably engaged with the guide groove and carried on a rear end of an output shaft which is supported rotatably and inclinably by a bearing member inclinably supported by the casing, a valve drive shaft supporting a disk-shaped valve body via a crank and supported on a machine frame so as to be co-rotatable and co-inclinable with the output shaft, a connector socket extending forward from the bearing member into engagement with the valve drive shaft so as to slightly push down or raise up the valve drive shaft thereby to urge the valve body toward or away from a valve seat so that the valve takes its closing position or its preparatory position before the valve is rotated to take its releasing position.

12 Claims, 12 Drawing Figures

VALVE ACTUATING MECHANISM

This application is a continuation-in-part of my copending application Ser. No. 764,412, filed Aug. 9, 1985 now abandoned.

BACKGROUND OF THE INVENTION

1. Field of the Invention:

This invention relates to a valve actuating mechanism, and more particularly to improvements in a mechanism for actuating a particular non-slidable disk type valve which is actuated by a particular cylindrical cam of the type that reciprocates to put a cooperating output shaft into cycles of rotational and seesaw motion, via a cooperative cam follower.

The non-slidable disk type valve herein means a particular valve of the type that has a disk-shaped valve body which is slightly movable toward and away vertically from a stationary valve seat without any slidable relation therebetween and which is rotatable about a horizontal axis to take its releasing position. The valve arrangement according to the invention is advantageously applicable to supply of powder, granule, grains and liquid.

2. Description of the Prior Art:

The non-slidable disk type valve per se for supply of powder, granule, grains and liquid is known and typical examples of such valve are disclosed in Japanese Utility Model Publication No. 59-1998 published on Jan. 19, 1984 (Application No. 55-83462, filed June 14, 1980) and also in Japanese Patent Application Laid-open No. 61-192972, laid-open on Aug. 27, 1986 (Application No. 60-34911d, filed Feb. 22, 1985). In these references, however, there is no teaching about mechanism for actuating such particular non-slidable disk type valve.

On the other hand, the cylindrical cam per se of the above type, which may be utilized to actuate the aforesaid non-slidable disk type valve, is also known and a typical example of such cam is disclosed in Japanese Patent Application Laid-open No. 51-57377, laid-open May 19, 1976 (Application No. 49-131474, filed Nov. 14, 1974). In this reference, however, teaching is directed only to a particular mechanism for actuating a specific conical sliding valve, and there is no teaching about a mechanism for actuating the afore-discussed non-slidable, disk-shaped valve which is a subject matter of the present invention.

An important feature of the invention resides in an advantageous combination of the above-discussed particular non-slidable disk type valve arrangement with an improved particular cylindrical cam arrangement according to the invention, and more specifically in improvements in a joint structure between the valve and the cam arrangements.

Another important feature of the invention resides in a particular application of the improved cylindrical cam arrangement to actuation of the above-discussed non-slidable disk-shaped valve in a more advantageous manner than that of the conventional cam arrangement as disclosed in the aforesaid Japanese Patent Application Laid-open No. 51-57377.

Figure 12:
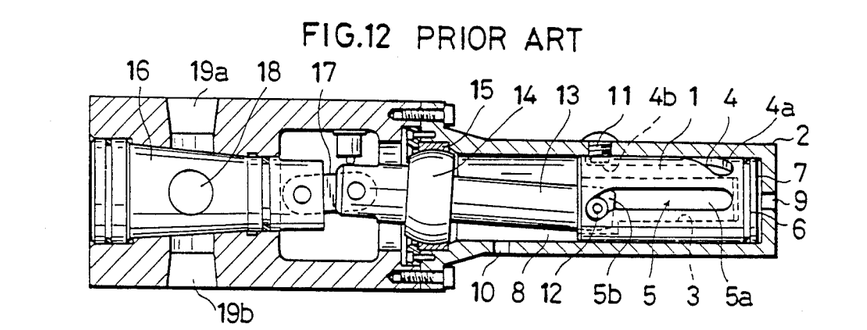
FIG. 12 is a side elevation illustrating an example of a prior art valve actuating mechanism.

For the purpose of better understanding, the aforesaid conventional cylindrical cam arrangement is herein illustrated in FIG. 12 of the accompanying drawings, wherein a cylindrical cam arrangement includes a hollow, grooved cylindrical body 1 supported rotatably and axially slidably within a stationary casing 2. The cam body 1 has an internal space defined by a cylindrical wall 3 in which a first and a second guide grooves 4, 5 are formed independently.

An seal ring 6 is mounted on the periphery of the cam body for separating the internal space of the casing 2 into two air-tight chambers 7, 8 each connected to an unillustrated external pressure source via air ports 9, 10 formed in the casing wall. More particularly, the port 9 serves as an inlet/outlet for charging pressurized air into or discharging the same from the rear chamber 7 while the other port 10 serves also as an inlet/outlet for charging pressurized air into or discharging the same from the front chamber 8. Thus, the cylindrical cam body 1 is forced to reciprocate by the pressurized air alternately introduced into the chambers 7, 8 via the ports 9, 10.

The first groove 4 has a spiral portion 4a which extends spirally with respect to an axis of the cylindrical body 1, so that a first cam follower 11, which is fixed to the casing 2 and radially extends into relatively movable (slidable or rotatable) engagement with the groove 4, can put the cam body 1 into rotational motion when the cam body reciprocates. The first groove 4 further includes a straight front end portion 4b which extends in parallel with respect to the axis of the cylindrical body 1, so that the first cam follower 11 can impart rectilinear motion to the cylindrical body 1.

The second groove 5 has an axially extending straight portion 5a and an oblique front end portion 5b whose axis is inclined by a certain angle with respect to an axis of the straight portion 5a. The second groove 5 cooperates with a second cam follower 12 supported on a rear end portion of an output shaft 13 which is rotatably and inclinably supported at its enlarged flange 14 with a spherically convexed external surface slidable relative to a spherically concaved internal surface of a bush 15 fixed to a front end portion of the casing 2. The output shaft 13 extends rearward into the internal space of the cam body 1, as shown partially in phantom lines, so that the second cam follower 12 carried on the rear end portion of the shaft 13 extends radially into relatively movable engagement with the second groove 5.

Thus, when the cam body 1 moves rearward (rightward in FIG. 12), so that the second cam follower 12 is in the oblique front end portion 5b while the first cam follower 11 is in the straight front end portion 4b during reciprocation of the cam body, the output shaft 13 is put into seesaw motion.

On the other hand, when the cam body 1 moves forward (leftward in FIG. 12), so that the second cam follower 12 is in the straight portion 5a while the first cam follower 11 is in the spiral portion 4a, the output shaft 13 is forced to rotate about its axis. Consequently, a conical valve body 16, which is connected via a toggle joint 17 to the output shaft 13, is corotated with the shaft 13, so that a passageway for liquid, which is in the form of a cross hole 18 extending through the valve body 16, is coaxially aligned with an inlet passageway 19a and also with an outlet passageway 19b.

As a result, a liquid to be supplied is permitted to flow from the inlet passageway 19a through the valve passageway 18 to the outlet passageway 19b. When the valve body 16 is rotated so that its passageway 18 is not coaxial with the inlet and outlet passageways 19a, 19b, the valve takes its closing position.

As will be apparent from the above description, the prior art cylindrical cam is forced to rotate while reciprocating simultaneously during a greater part of strokes of the cylindrical cam body. Consequently, it is possible to say that the prior art cylindrical cam arrangement of the illustrated type has a disadvantage that the above-described seal ring easily wears out because it undergoes repeated frictions developed by the simultaneous rotation and reciprocation of the cylindrical cam body.

Further, it will be easily understood that the valve actuating mechanism as illustrated and described with reference to FIG. 12 is not readily applicable to actuation of the specific disk-shaped valve as disclosed in the above referenced Japanese Utility Model Publication No. 59-1998 and Japanese Patent Application Laid-open No. 61-192972.

SUMMARY OF THE INVENTION

It is, therefore, an object of the invention to provide an improved actuating mechanism for opening and closing a particular non-slidable disk type valve for supply of powder, granule, grains and liquid.

Another object of the invention is to provide an improved joint structure for an advantageous connection of a non-slidable disk type valve arrangement with a cylindrical cam arrangement.

A further object of the invention is to provide an improved, non-rotatable cylindrical cam arrangement which is designed for an advantageous application to an actuating mechanism for a particular non-slidable disk type valve.

Other objects, features and advantages of the invention will become apparent from the detailed description given hereinafter; it should be understood, however, that the detailed description and specific examples, while indicating preferred embodiments of the invention, are given by way of illustration only, since various changes and modifications within the spirit and scope of the invention will become obvious to those skilled in the art from this detailed description.

According to the invention, there is provided a mechanism for actuating a non-slidable disk type valve body, which comprises: a hollow cylindrical, stationary casing; a hollow, grooved cylindrical cam body axially movable within the stationary casing; an output shaft extending rearward into an internal space of the cam body and being journalled by a bearing member which is interposed between the output shaft and a first bush secured to an internal wall of the stationary casing, the bearing member having a spherically convexed external surface slidable relative to a spherically concaved internal surface of the first bush; a connector socket extending forward from the bearing member and co-inclinable with the bearing member; a second bush having a spherically concaved internal surface and secured to an internal wall of a front end portion of the connector socket; a valve drive shaft having a collar member fixedly mounted thereon, the collar member having a spherically convexed external surface slidable relative to the spherically concaved internal surface of the second bush, the valve drive shaft having its rear end engaged with a front end of the output shaft in such a manner that the valve drive shaft is corotatable with the output shaft but free to move crosswise relative to the front end of the output shaft; means for supporting the valve drive shaft so as to be rotatable about its own axis and inclinable within a limited range; a guide groove formed in a cylindrical wall of the cam body and including a spiral portion and an oblique front end portion smoothly joined by an intermediate transitional portion; a cam follower mounted on a rear end portion of the output shaft and extending into relatively movable engagement with the guide groove; a valve supporting crank fixedly secured to a front end of the valve drive shaft, wherein the spiral portion of the guide groove extends spirally with respect to a longitudinal axis of the cam body to impart rotational motion to the output shaft via the cam follower thereby to put the valve drive shaft into rotational motion when the cam body reciprocates with the follower engaged in the spiral portion, and the oblique front end portion of the guide groove extends forwardly from the transitional portion in inclination by a limited angle with respect to the longitudinal axis of the cam body to impart seesaw motion to the output shaft thereby to put the valve drive shaft into seesaw motion when the cam body reciprocates with the cam follower engaged in the oblique front end portion.

DESCRIPTION OF THE PREFERRED EMBODIMENTS

Referring now to the accompanying drawings, a valve actuating mechanism according to the invention includes a disk-shaped valve body 20 mounted on or integral with a pair of opposed crank arms 21a, 21b.

The one crank arms 21a is rigidly secured to a front end of a valve drive shaft 22 by means of clamp a screw 23. The other crank arm 21b may be rigidly secured to a support shaft 25 which is rotatably and inclinably supported by a first bearing unit 26 fixed to one side wall 27a of a housing 27. Alternatively, the crank arm 21b may be rotatably mounted to the support shaft 25 via of a known ball or roller bearing member (not seen) retained in an enlarged base portion 21c of the crank arm 21b, wherein the support shaft 25 is non-rotatably but inclinably supported by the bearing unit 26.

The bearing unit 26 may includes a known elastically deformable tubular bearing member 28 formed of a wear-resistant synthetic resin available in the market and housed within a bearing case 29. The bearing unit 26 further includes a bush 30 secured internally of the bearing case 29 and having a spherically concaved internal surface slidable relative to a spherically convexed external surface of a collar member 31 fixedly secured to a forward end of the support shaft 25.

The bearing unit 26 per se does not constitute an important feature of the present invention since it may take various desired forms known to those skilled in the art. Further, the bearing unit 26, the support shaft 25 and the crank arm 21b may be omitted in the case where the valve arrangement is designed for light load.

The valve drive shaft 22 is rotatably and inclinably supported by a second bearing unit 32 which is fixed to another side wall 27b of the housing 27 and which is located opposite to the first bearing unit 26. The second bearing unit 32 may also include an elastically deformable tubular bearing member 33 similar to the described member 28, a bearing case 34 for retaining the bearing member 33 therein, and a rearwardly flared cap 35 secured to the case 34. The second bearing unit 32 may also take various desired forms and does not constitute a feature of the invention.

In view of the particular construction described above, the valve drive shaft 22 is not only rotatable about its own axis but also inclinable within a limited range in a vertical plane as the bearing member 33 is deformed. In order to permit the shaft 22 to incline, the cap 35 is outwardly flared at its open rear end, as illustrated.

The valve body 20 preferably has a conical side surface 20s which is advantageous for smooth engagement with and disengagement from a valve seat 36 which is fixed to a top wall 27c of the housing 27. The valve seat 36 is formed with a central opening 37 coaxial with an opening mouth 38 formed in the top wall 27c.

A hopper 39 is mounted on the top wall 27c, so that its internal space is communicated, through the openings 37, 38, with the internal space of the housing 27 when the valve body 20 is in its releasing position, as will be hereinafter described in detail.

The drive shaft 22 extends through the bearing unit 32 into an internal space of a connector socket 40 to be hereinafter described in detail. The drive shaft 22 has a collar member 41 mounted on its portion disposed within the connector socket 40. The collar member 41 has a spherically convexed external surface slidable relative to a spherically concaved internal surface of a bush 42 secured to an internal wall of the connector socket 40.

The drive shaft 22 has its rear end 22a engaged with a front end 43a of an output shaft 43 of an actuator or cam arrangement in such a manner that the shaft end 22a is free to move, relative to the shaft end 43a end, in a vertical plane within a predetermined limited range but restricted from horizontal displacement relative to the shaft end 43a.

More specifically, the shaft end 22a is formed with an open slot 44 defined by a pair of opposed internal vertical walls 44a, 44b, while the shaft end 22a is formed into a flat surfaced projection having a pair of vertical walls 45a, 45b. The projection or end 22a is simply inserted into the open slot 44, with the vertical walls 44a, 44b and 45a, 45b relatively slidable to each other, as best illustrated in FIG. 5.

Figure 5:
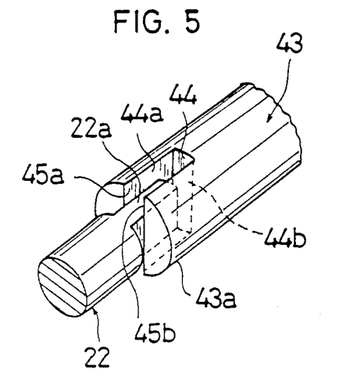
FIG. 5 is an enlarged, fragmentary perspective view illustrating engagement of the output shaft with the valve drive shaft.

The free connection structure as illustrated in FIG. 5 is a simple example thereof, and a known Oldham's coupling may also be utilized for such free connection.

The shaft ends 22a, 43a are disposed within the connector socket 40 which is inclinable relative to an axis of the valve drive shaft 22 in a vertical plane, under relatively slidable engagement of the collar member 41 with the bush 42.

The bush 42 may be fixedly mounted on the valve drive shaft 22 for co-rotation therewith. Alternatively, the shaft 22 may be free to rotate relative to the bush 41 by means of an unillustrated ball or roller bearing interposed between the bush 41 and the shaft 22.

Disposed adjacent to the slotted end 43a of the output shaft 43 is a ball bearing 46 mounted on the shaft 43. The ball bearing 46 has a spherically convexed external surface 47 slidable relative to a spherically concaved internal surface of a bush 48 which is fixedly secured to an internal wall of a front end portion of a stationary tubular casing 49 of the cam arrangement so that the bearing 46 is angularly movable relative to the bush 48. Thus, the output shaft 43 is rotatable about its own axis but also inclinable within a limited angular range.

Figure 6:
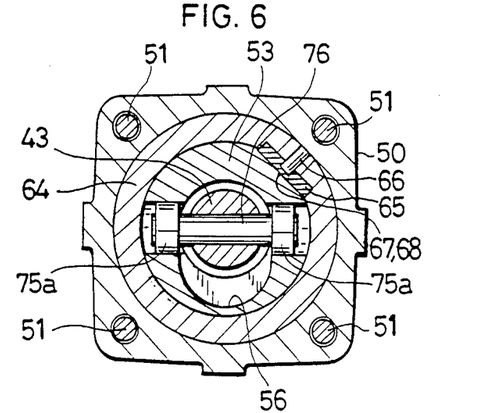
FIG. 6 is an enlarged cross section taken along the lines 6—6 of FIG. 2.

The tubular casing 49 may preferably be of two-piece construction for convenience of assembly of the cam arrangement, and coupled together by means of flanges 50 and clamping bolts 51 as illustrated in FIG. 6.

The connector socket 40 extends forward from the ball bearing 46 to have its spherical bush 42 slidably engaged with the spherical collar member 41 on the rear end of the valve drive shaft 22, as described in the foregoing. The connector socket 40 may preferably be fixedly connected with the ball bearing 46 so that it does not corotated with the output shaft 43. Alternatively, the connector socket 40 may be supported on the front end portion of the output shaft 43 so as to be corotatable with the shaft 43.

The above described structure according to the invention permits seesaw motion of the output shaft 43.

Figure 7:
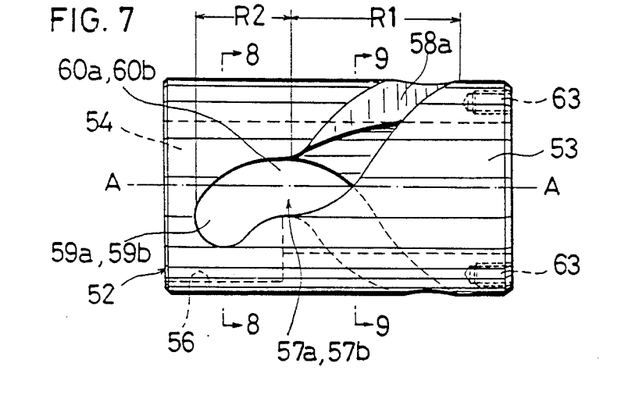
FIG. 7 is an enlarged side elevation showing a cylindrical cam body.
Figure 8:
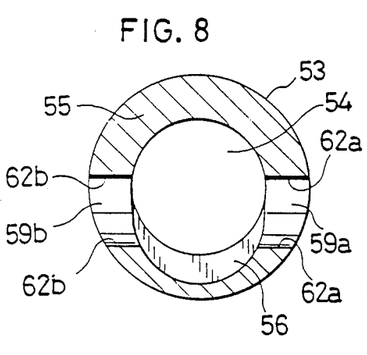
FIG. 8 is a cross section taken along the lines 8—8 in FIG. 7.
Figure 9:
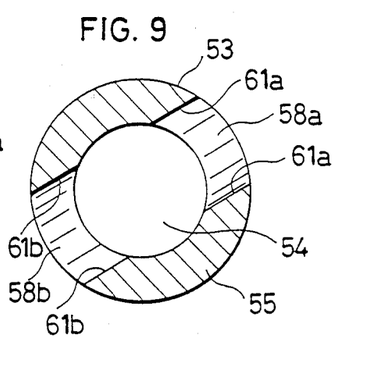
FIG. 9 is a cross section taken along the lines 9—9 in FIG. 7.

A cylindrical cam 52 is disposed within the stationary casing 49. As best illustrated in FIGS. 7 to 9, the cam 52 has a hollow, grooved cylindrical body 53 which has an axially extending internal space 54 formed therein and defined by a cylindrical wall 55, so that the output shaft 43 can extend into the space 54. Adjacent to an opening mouth, the cylindrical body 53 is formed with an internal cavity 56 (FIGS. 7, 8) for increasing a radial dimension of the internal space 54 for the purpose to be hereinafter described.

A pair of open guide grooves 57a, 57b (shown in phantom lines in FIG. 7 is a part of the groove 57b) are formed in the cylindrical wall 55 in such a manner that one groove lies substantially in one semicircular half of the cylindrical wall 55 of the body 53 while the other groove lies substantially in the other semicircular half of the wall 55. More particularly, in FIG. 7, the groove 57a is in one semicircular half above a center line A—A, while the other groove 57b is in the other semicircular half below the line or axis A—A.

Each of the grooves has a spiral portion 58a, 58b and an oblique front end portion 59a, 59b joined by an intermediate transitional portion 60a, 60b.

A pair of the spriral portion 58a, 58b are disposed symmetrically with respect to the axis A—A and extend spirally in a certain predetermined range R1 of a whole axial length of the cam body 53 as shown in FIG. 7 and within a range of one quarter of a circle defining the circumference of the cam body 53, as shown in FIG. 7.

A pair of the oblique front end portion 59a, 59b are disposed so as to be transversely opposite to each other and extend forward from the transitional portion 60a, 60b in inclination by a certain predetermined angle with respect to the longitudinal axis A—A, as shown in FIGS. 7 and 8.

The transitional portions 60a, 60b and the front end portions 59a, 59b lie in a certain predetermined range R2 of the whole axial length of the cylindrical body 33. In the embodiment of FIGS. 1 to 9, the transitional portions 60a, 60b are quite limited in their axial length for the purpose to be hereinafter described.

Each pair of spaced walls 61a and walls 61b respectively defining the spiral portions 57a, 57b terminate at their front ends in a pair of spaced walls defining the corresponding transitional portion, while each pair of spaced walls 62a and walls 62b respectively defining the oblique front end portion 59a, 59b also terminate at their rear ends in the walls of the corresponding transitional portion. Thus, all of such walls defining each groove 57a, 57b are smoothly joined together at the transitional portion to provide smooth and continuous wall surfaces.

Incidentally, reference numeral 63 in FIG. 7 designates threaded holes which serve as will be hereinafter described.

The cylindrical cam 52 is axially slidable but restricted from rotation within the stationary casing 49. For this purpose, as illustrated in FIG. 6, an annular sleeve 64 is secured to the internal cylindrical wall of the casing 49, while a detent metal 65 may be embedded in an internal wall of the sleeve 64 and fixed there by means of a fixing pin 66. The detent metal 65 has a flat, exposed guide surface 67 which is in relatively slidable contact with a flat cut away surface 68 formed on and extending along an external wall of the cam body 53. Thus, the cam body simply reciprocates without rotation about its axis.

The stationary casing 49 of the invention serves as a stationary cylinder while the cylindrical cam 52 has a piston 69 secured to the rear end face of the cylindrical body 53 by means of known clamp screws (not shown) screwed into the aforesaid threaded holes 63 shown in FIG. 7. The piston 69 has a known o-ring 70 mounted on its peripheral wall, conventionally.

The cam body 53 may be put into reciprocating motion mechanically or pneumatically. In the illustrated example, a pneumatic drive system is employed which includes a first air port 71 communicating with a rear pressure chamber 72 formed behind the piston 69, and a second air port 73 communicating with a front pressure chamber 74 formed in front of the piston. The air ports 71, 73 are connected via known conduits (not shown) to a known external air pressure source (not shown), conventionally.

Figure 1:
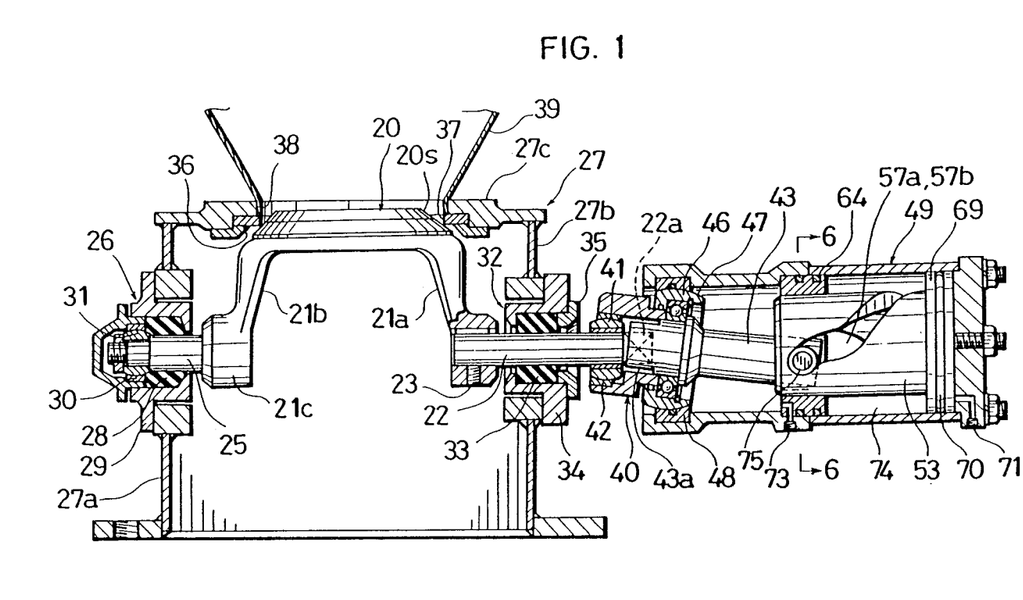
FIG. 1 is a side elevation showing a valve actuating mechanism according to the invention, in which a non-slidable, disk-shaped valve body is in its closing position.
Figure 2:
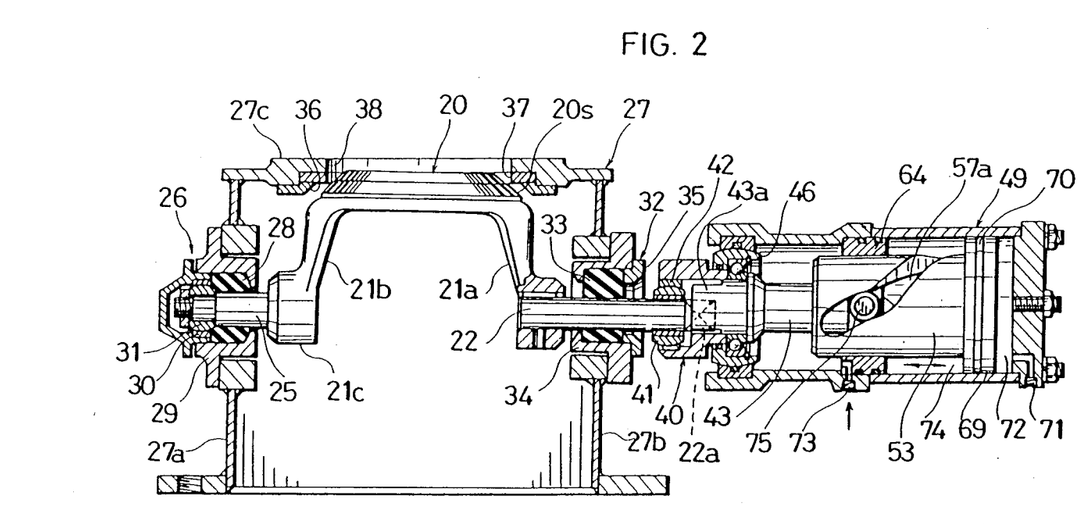
FIG. 2 is a view similar to FIG. 1, in which the valve body is slightly spaced away from a valve seat.
Figure 3:
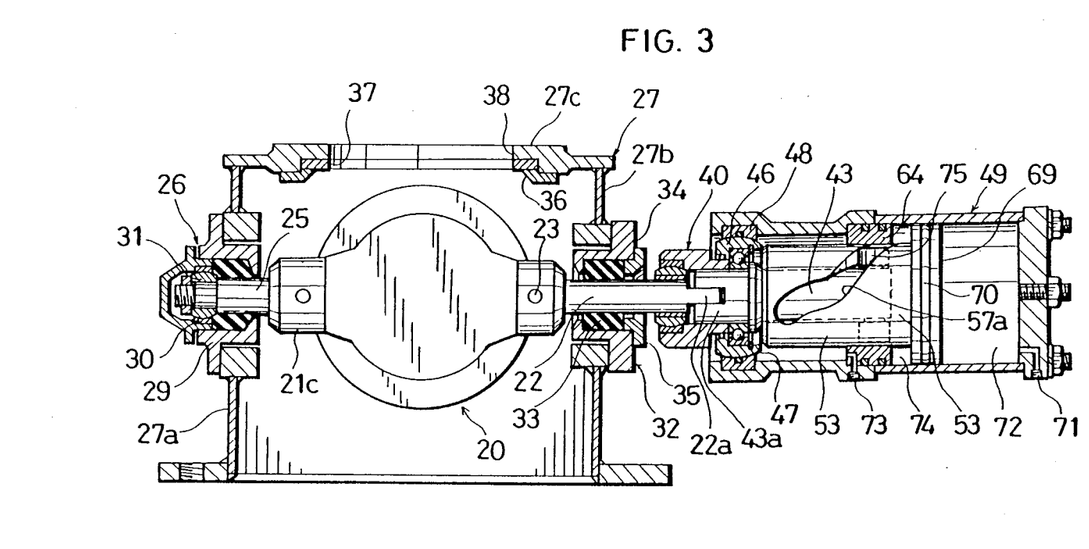
FIG. 3 is also a view similar to FIG. 2, in which the valve body is turned by 90° for taking its fully releasing position.

On the rear end of the output shaft 43, a pair of cam followers 75 are directly or indirectly mounted in position so as to be diametrically opposite to each other. Each cam follower 75 radially extends into relatively movable engagement with the groove 57a, 57b. More particularly, the cam followers 75 may be in the form of a pair of rollers 75a (FIG. 6) each of which is freely rotatably supported by a cross pin 76 so as to rotate on the opposed walls of the groove 57a, 57b as shown in FIGS. 1 to 3. Alternatively, the cam followers may be in the form of a pair of known cross pins (not shown) each of which is slidable on the opposed walls of the groove 57a, 57b when the cam body reciprocates. If desired, the pair of the pins may be combined into one piece which extends diametrically from one of the grooves 57a, 57b through the output shaft 43 into the other of grooves.

In operation, when pressure air is introduced via the air port 73 into the front pressure chamber 74, the piston 69 with the cam body 53 is forced to move axially rearward with the result that the cam followers 75 on the output shaft 43 become engaged with the oblique front end portions 59a, 59b of the guide grooves 57a, 57b, where the rear end of the output shaft 43 is urged down while the front end 43a thereof is urged up. Consequently, the connector socket 40 becomes inclined with its front end up in order to slightly raise up the valve drive shaft 22 via the bush 42 and the collar member 41 so that the valve body 20 is forcibly pushed upward against the valve seat 36 to take its closing position, as illustrated in FIG. 1. In this phase, an axis X of the output shaft 43 is inclined with respect to a co-axis Y of the support shaft 25 and the valve drive shaft 22, as diagrammatically shown in FIG. 4 (I).

Subsequently, when pressure air is introduced via the air port 70 into the rear pressure chamber 72, the piston 69 with the cam body 53 is turned to move axially forward with the result that the cam followers 75 on the output shaft 43 are disengaged from the oblique front end portions 59a, 59b and put into engagement with the transitional portions 60a, 60b, where the rear end of the output shaft 43 is urged up while the front end 43a thereof is urged down. Consequently, the bush 32 on the connector socket 40 pushes down the collar 41 on the valve drive shaft 22 so that the shaft 22 is forced to take a lower level position than that shown in FIG. 1. Thus, the valve body 20 carried on the shaft 22 is moved down slightly away from the valve seat 36 for preparation of the subsequent rotational motion of the valve body 20, as illustrated in FIG. 2. In this second phase, the co-axis Y of the shafts 25, 22 is slightly inclined with respect to the axis X of the output shaft 43, as diagrammatically shown in FIG. 4 (II).

Figure 4:
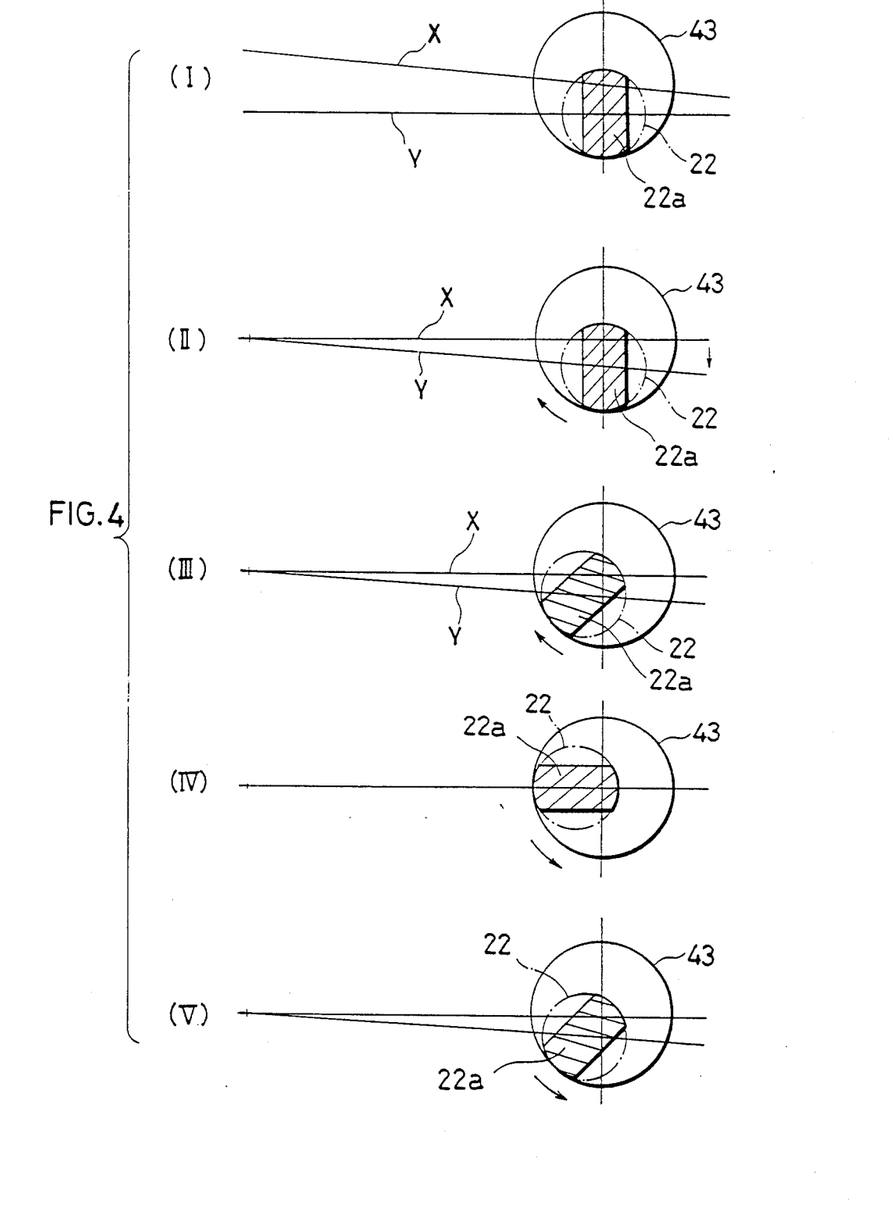
FIG. 4 is a series of explanatory diagrams illustrating a cycle of variable inclination angles of a valve drive shaft relative to a reference line and a cycle of variable positions of the same shaft relative to an output shaft.

As the piston 69 with the cam body 52 further moves forward, the cam followers 75 on the output shaft 43 are put into engagement with the spiral portions 58a, 58b of the guide grooves 57a, 57b, whereby the output shaft 43 and the valve drive shaft 22 are forced to corotate in the direction of arrows in FIG. 4(II) to (IV). When the cam followers 75 reach the rear extremities of the spiral portions 58a, 58b, the output shaft 43 and the valve drive shaft 22 are corotated by 90° so that the valve body 20 is turned by 90° about the axis Y to take its fully releasing position, as illustrated in FIG. 3.

It will be easily understood that the output shaft 43 is forced again to move rearward by introducing the pressurized air again into the front pressure chamber 74 so that the valve body 20 takes its closing position as illustrated in FIG. 1. In this manner, the output shaft 43 actuates the valve drive shaft 22 to open and close the valve body 20.

It is apparent that by varying a radial dimension of the cavity 56, an angle of inclination of the output shaft 43 can be varied as desired.

Figure 10:
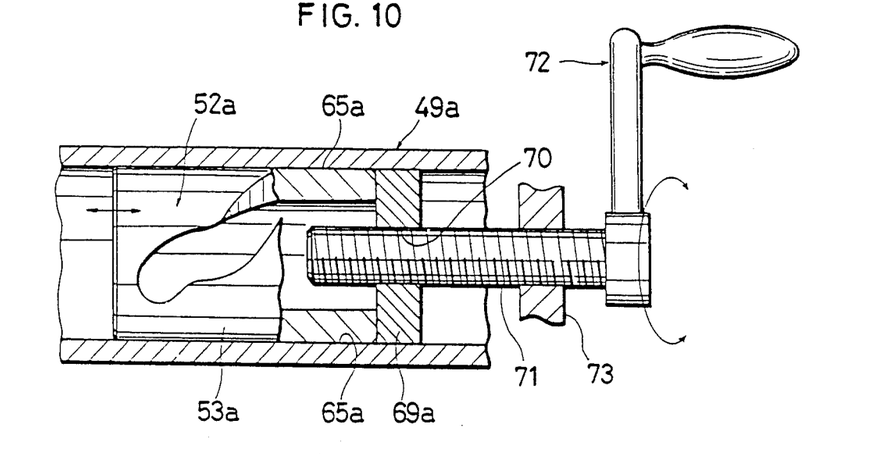
FIG. 10 is a longitudinal section, with parts broken away, showing a modified embodiment of the invention.

FIG. 10 illustrates a modified embodiment, wherein a cam 53a and a piston 69a are designed for manual, mechanical operation. More particularly, a pair of opposite contact surfaces 65a between a stationary casing 49a and a hollow, grooved cylindrical cam body 53a are flat slide surfaces which prevent the cam body 53a from rotation relative to the casing 49a. The piston 69a is formed with a threaded hole 70 which is engaged with a threaded shaft 71 of a handle 72. The threaded shaft 71 is screwably supported by an internally threaded fixed support 73. By turning the handle 72 in one direction, the cam body 53a moves forward, while, by turning the handle in the opposite direction, the cam body 53a moves rearward. Thus, it is possible to make reciprocation of the cam body 53a by manual operation of the handle 72.

Figure 11:
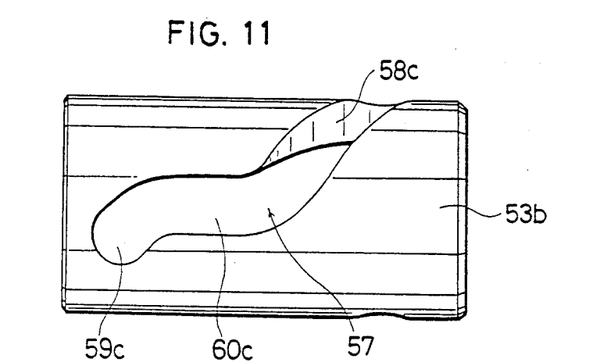
FIG. 11 is a view similar to that of FIG. 7, but showing a modification of the cylindrical cam body.

FIG. 11 illustrates a modification of the cylindrical cam, wherein only one guide groove 57 is formed in the cylindrical wall of a cam body 53b. The groove 57 has a spiral portion 58c, an intermediate transitional portion 60c and an oblique front end portion 59c. The spiral portion 58c and the oblique front end portion 59c are substantially identical in form and function with the corresponding portions 58a, 60a of the guide groove 57a described in detail in the foregoing.

However, the intermediate transitional portion 60c extends straight in parallel with the longitudinal axis of the cam body 53b and is greater in axial length than the corresponding portion 60a of the groove 57a in the described embodiment of FIG. 7. Thus, the cam follower 75 stays in the intermediate portion 60c for a longer time than that in the case of FIG. 7. The output shaft 43 remains standstill as long as the cam follower stays within the intermediate portion 60c. Consequently, the embodiment of FIG. 11 is capable of providing a longer pause between the rotational motion and the seesaw motion of the output shaft 43. A length of such pause can be varied by varying the axial length of the intermediate portion as desired.

The present invention being thus described, it will be obvious that same may be varied in many ways. Such variations are not to be regarded as a departure from the spirit and scope of the invention, and all such modifications as would be obvious to one skilled in the art are intended to be included within the following claims.

I claim:

1. A mechanism for actuating a non-slidable disk type valve body, comprising
    a hollow cylindrical, stationary casing,
    a hollow, grooved cylindrical cam body axially movable within said stationary casing,
    an output shaft extending rearward into an internal space of said cam body and being journalled by a bearing member which is interposed between said output shaft and a first bush secured to an internal wall of said stationary casing,
    said bearing member having a spherically convexed external surface slidable relative to a spherically concaved internal surface of said first bush,
    a connector socket extending forward from said bearing member and co-inclinable with said bearing member,
    a second bush having a spherically concaved internal surface and secured to an internal wall of a front end portion of said connector socket,
    a valve drive shaft having a collar member fixedly mounted thereon,
    said collar member having a spherically convexed external surface slidable relative to said spherically concaved internal surface of said second bush,
    said valve drive shaft having its rear end engaged with a front end of said output shaft in such a manner that said valve drive shaft is corotatable with said output shaft but free to move crosswise relative to said front end of said output shaft,
    means for supporting said valve drive shaft so as to be rotatable about its own axis and inclinable within a limited range,
    a guide groove formed in a cylindrical wall of said cam body and including a spiral portion and an oblique front end portion smoothly joined by an intermediate transitional portion,
    a cam follower mounted on a rear end portion of said output shaft and extending into relatively movable engagement with said guide groove,
    a valve supporting crank fixedly secured to a front end of said valve drive shaft,
    said spiral portion of said guide groove extending spirally with respect to a longitudinal axis of said cam body to impart rotational motion to said output shaft via said cam follower thereby to put said valve drive shaft into rotational motion when said cam body reciprocates with said cam follower engaged in said spiral portion, and
    said oblique front end portion of said guide groove extending forwardly from said transitional portion in inclination by a limited angle with respect to said longitudinal axis of said cam body to impart seesaw motion to said output shaft thereby to put said valve drive shaft into seesaw motion when said cam body reciprocates with said cam follower engaged in said oblique front end portion.

2. The mechanism as defined in claim 1, which includes
    an additional valve supporting crank fixedly secured to a support shaft extending coaxially of said valve drive shaft, and
    means for supporting said support shaft so as to be rotatable about its own axis and inclinable simultaneously with said valve drive shaft.

3. The mechanism as defined in claim 1, wherein said connector socket is secured to said bearing member and non-rotatable relative to said output shaft.

4. The mechanism as defined in claim 1, wherein said connector socket is secured to said output shaft for corotation therewith.

5. The mechanism as defined in claim 1, wherein an axial length of said transitional portion of said guide groove is short enough to permit immediate conversion of said rotational motion into said seesaw motion and vice versa.

6. The mechanism as defined in claim 1, wherein said transitional portion of said guide groove extends straight in parallel with said axis, and
    an axial length of said transitional portion is large enough to provide a pause between said rotational motion and said seesaw motion.

7. The mechanism as defined in claim 1, wherein said spiral portion of said guide groove is within a range of a quarter of a circle defining a circumference of said cam body.

8. The mechanism as defined in claim 1, wherein said cam body has an internal cavity formed in said cylindrical wall for communication with said internal space of said cam body to increase a radial dimension of said internal space.

9. The mechanism as defined in claim 1, wherein a pair of said guide grooves are formed in said cylindrical wall of said cam body, one of said pair of said guide grooves lying substantially in one semicircular half of said cylindrical wall and another of said pair of said guide grooves lying substantially in another semicircular half of said cylindrical wall, and a pair of said cam followers are relatively movably engaged with said pair of said guide grooves.

10. The mechanism as defined in claim 1, wherein,
said rear end of said valve drive shaft is formed into a flat surfaced projection, and
said front end of said output shaft is formed with an open slot defined by a pair of opposed walls, said flat surfaced projection being relatively movably received within said open slot.

11. The mechanism as defined in claim 1, wherein said cam body is secured to a piston which is pneumatically reciprocated within said stationary casing.

12. The mechanism as defined in claim 1, wherein said cam body is secured to a piston which is mechanically reciprocated within said stationary casing.

* * * * *